United States Patent [19]
Swett

[11] 3,764,688
[45] Oct. 9, 1973

[54] 4,6-DIHYDRO-1,3-DIMETHYL-8-PHENYL-4-PROPARGYL-PYRAZOLO [4,3-E] DIAZEPIN-5 (1H) ONE IN TREATING INFLAMMATION

[75] Inventor: Leo Ralph Swett, Waukegan, Ill.

[73] Assignee: Abbott Laboratories, North Chicago, Ill.

[22] Filed: July 27, 1972

[21] Appl. No.: 275,858

Related U.S. Application Data

[62] Division of Ser. No. 69,465, Sept. 3, 1970, abandoned.

[52] U.S. Cl. ............................................... 424/274
[51] Int. Cl. .............................................. A61k 27/00
[58] Field of Search .................................... 424/274

Primary Examiner—Stanley J. Friedman
Attorney—Robert L. Niblack

[57] ABSTRACT

4,6-Dihydro-1,3-dimethyl-8-phenyl-4-propargylpyrazolo[4,3-e] [1,4]diazepin-5(1H) one as an anti-inflammatory agent.

2 Claims, No Drawings

4,6-DIHYDRO-1,3-DIMETHYL-8-PHENYL-4-PROPARGYL-PYRAZOLO [4,3-E] DIAZEPIN-5 (1H) ONE IN TREATING INFLAMMATION

CROSS-REFERENCE TO RELATED APPLICATION

This application is a divisional of U.S. Pat. Ser. No. 69,465, filed Sept. 3, 1970, now abandoned.

DETAILED DESCRIPTION OF THE INVENTION

A number of humans and animals are known to suffer from various rheumatic conditions involving inflammation, swelling, tenderness, decreased mobility, pain and fever. While there are a number of presently available anti-inflammatory agents which have been found to be effective in the symptomatic treatment of conditions such as rheumatoid arthritis, rheumatoid spondylitis and degenerative joint disease (osteroarthritis) of the hip, such agents exhibit various undesirable side effects. Thus, the search for improved antiinflammatory agents continues. The present invention provides a novel compound which exhibits anti-inflammatory activity.

The novel compound of this invention, 4,6-dihydro-1,3-dimethyl-8-phenyl-4-propargylpyrazolo[4,3-e][1,4]diazepin-5(1H)one, is represented by the structural formula

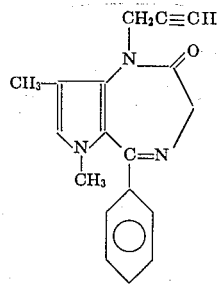

The compound of this invention is an excellent antiinflammatory agent having an oral $ED_{25}$ of approximately 50 mg./kg. in the carrageenan rat paw edema test [Winter et al., *Proc. Soc. Exp. Biol. Med.* 111, 544 (1962)]. The oral $LD_{50}$ of the compound is greater than 500 mg./kg. in rats. Generally speaking, the compound is administered to patients in dosages of from 5 to 100 mg./kg. of body weight daily, preferably in divided doses. It is presently preferred that from 250 to 1,000 mg. of the compound be administered daily to patients suffering from various inflammatory diseases such as rheumatoid arthritis and the like, preferably in divided doses of, for example, 250 mg. two to four times a day.

4,6-Dihydro-1,3-dimethyl-8-phenyl-4-propargyl-pyrazolo[]4,3-e][1,4]diazepin-5(1H)one can be prepared from 1,3-dimethyl-4-nitro-5-pyrazolecarboxylic acid by methods well known in the art. Generally speaking, 1,3-dimethyl-4-nitro-5-pyrazole-carboxylic acid is converted to 4,6-dihydro-1,3-dimethyl-8-phenylpyrazolo[4,3-e][1,4]diazepin-5(1H)one following the method described by Archer and Sternback, *J. Org. Chem.* 29, 231 (1964). The 4,6-dihydro-1,3-dimethyl-8-phenylpyrazolo[4,3-e][1,4]diazepin-5(1H)one is then reacted with a propargylhalide to yield the desired product.

The following example further illustrates the present invention:

EXAMPLE

Preparation of 4,6-dihydro-1,3-dimethyl-8-phenyl-4-propargyl-pyrazolo[4,3-e][1,4]diazepin-5(1H)one A. 5-Benzoyl-1,3-dimethyl-4-nitropyrazole 111 g. of 1,3-dimethyl-4-nitro-5-pyrazolecarboxylic acid, prepared according to the method of Papesch & Dodson, *J. Org. Chem.* 30, 199 (1965), was suspended with stirring in 1 liter of boiling toluene and treated with 42 g. of thionyl chloride. The reaction mixture was refluxed with stirring overnight. The reaction mixture was then filtered to remove the insoluble material and the filtrate was concentrated to a residue in vacuo. The residue was taken up in 1 liter of hot Skelly B whereupon the corresponding acid chloride separated as an oil. The acid chloride (65.0 g.), m.p. 43°–46°, crystallized upon scratching and chilling.

363 g. of aluminum chloride was suspended in 800 ml. of benzene. To the aluminum chloride suspension was added portionwise 800 ml. of benzene containing 231 g. of the acid chloride, prepared as described above, over a period of approximately 1.5 hours. The reaction mixture was refluxed, with stirring, for 4.5 hours and allowed to stand at room temperature overnight. The decanted benzene layer was added to 3,800 ml. of water containing 480 ml. of concentrated HCl. The residue in the reaction flask was decomposed by the addition of dilute HCl. The residual tarry material was removed by suction filtration, the layers were separated and the aqueous layer was extracted several times with benzene. The benzene extracts were combined, washed with 1 liter of water, 1 liter of a 10 percent NaOH solution and then washed 3 times with 500 ml. portions of water. The combined, washed benzene extracts were dried over anhydrous magnesium sulfate and the benzene was removed on a rotary evaporator to yield 152.9 g. of crude residue. The residue was crystallized by dissolution in 500 ml. of benzene, with warming, filtration and dilution of the chilled filtrate with approximately 1,200 ml. of pentane. The filtrate was then chilled, scratched and seeded with a crystal of the pure nitro ketone and dried to yield 99.8 g. of yellow-orange crystals of 5-benzoyl-1,3-dimethyl-4-nitropyrazole, m.p. 62°–63°.

B. 4,6-Dihydro-1,3-dimethyl-8-phenylpyrazolo[4,3-e][1,4]-diazepin-5(1H)one

A solution of 81.6 g. of the above obtained 5-benzoyl-1,3-dimethyl-4-nitropyrazole in 1,000 ml. of ethyl alcohol (absolute) containing 85 drops of pyridine was hydrogenated at 60° in the presence of 7.3 g. of 6 percent palladium on charcoal for approximately 4-½ hours. The reaction mixture was cooled, filtered from the catalyst and washed and the solvent removed to yield 4-amino-5-benzoyl-1,3-dimethylpyrazole as an oil.

46 g. of the 4-amino-5-benzoyl-1,3-dimethylpyrazole was dissolved in 500 ml. of acetic acid with stirring. To the resulting deep reddish-brown solution was added dropwise 60.6 g. of bromoacetylbromide over a 10 minute period. The reaction temperature was maintained below 30° during the bromide addition, at which time the reaction mixture was a light orange color. The mixture was stirred at room temperature for 1 hour whereupon a precipitate formed. The reaction was allowed to stand overnight. The solid was then scraped onto a sintered glass filter and dried. The dried solid was added to water whereupon the material partially dissolved and then reprecipitated. The precipitate was filtered, washed three times wth water and dried to yield 45.3 g. of 1,3-dimethyl-4-bromoacetamido-5-benzoylpyrazole, m.p. 172°–173.5°. The acetic acid filtrate was worked up to yield an additional 4.7 g. of product, m.p. 169°–171° (benzene).

50.0 g. of 1,3-dimethyl-4-bromoacetamido-5-benzoyl-pyrazole, obtained as above described, was added portionwise to 2,000 ml. of liquid ammonia. The reaction mixture was stirred and the ammonia allowed to evaporate. The reaction mixture was then warmed on a steam bath to evaporate the excess ammonia. Water was added to the resulting viscous gum, the mixture was allowed to stand for 51 minutes, and the resulting precipitate was filtered, washed two times with water and dried in vacuo at 70°. The crude product was recrystallized from methanol to yield 29.5 g. of 4,6-dihydro-1,3-dimethyl-8-phenylpyrazolo-[4,3-e][1,4]diazepin-5(1H)one, m.p. 270°–272°. Analysis Calcd. for $C_{14}H_{14}N_4$: C, 66.14; H, 5.51; N, 22.07

Found: C, 66.17; H, 5.56; N, 22.25

C. 4,6-Dihydro-1,3-dimethyl-8-phenyl-4-propargyl-pyrazolo[4,3-e][1,4]diazepin-5(1H)one 6.7 g. of 4,6-dihydro-1,3-dimethyl-8-phenyl-pyrazolo[4,3-e][1,4]diazepin-5(1H)one, prepared as above, were reacted with 1.3 g. of 61 percent sodium hydride in 100 ml. of dimethylformamide at 70° C. for 1 hour and cooled. A solution of 3.3 g. of propargyl bromide in 100 ml. of dimethylformamide was added and the mixture stirred overnight at 80° C. The reaction mixture was allowed to cool and was filtered. The filtrate was concentrated to dryness in vacuo and the residue triturated with water. The reaction was then extracted with chloroform, washed with water and dried over magnesium sulfate. The drying agent and solvent were removed, and the remaining oil which was dissolved in ether and passed through a Woelm No. 1 alumina column. The resulting product was again extracted in ether and dried. Removal of the drying agent and solvent left a syrup which was again taken up in ether and passed over an alumina column to yield 5.7 g. of a syrupy glass. The glass was dissolved in ether (Skelly B) to yield 4.4 g. of crystalline product, m.p. 128.5°–130.0°.

Analysis Calcd. for $C_{17}H_{16}N_4O$: C, 69.84; H, 5.52; N, 19.17

Found: C, 69.99; H, 5.53; N, 19.18

The compound of this invention can be formulated into various pharmaceutical dosage forms such as tablets, capsules, pills and the like, for immediate or sustained release, by combining the compound with a suitable pharmaceutically acceptable carrier or diluent according to methods well known in the art. Such dosage forms may additionally include excipients, flavoring and sweetening agents, binders, fillers and other therapeutically inert ingredients necessary in the formulation of the desired pharmaceutical preparation.

I claim:

1. A method of relieving the symtoms of inflammation in a mammalian patient in need of such treatment comprising orally administering to said patient a therapeutically effective amount of 4,6-dihydro-1,3-dimethyl-8-phenyl-4-propargyl pyrazole[4,3-e][1,4]diazepin-5(1H)one.

2. The method of claim 1 wherein said compound is administered in dosages of from 5 to 100 mg./kg. of body weight daily.

* * * * *